United States Patent [19]

Galloway

[11] 4,126,102

[45] Nov. 21, 1978

[54] AQUARIUM AND METHOD OF MAKING SAME

[76] Inventor: James V. Galloway, 190 Sheridan Rd., Winnetka, Ill. 60093

[21] Appl. No.: 732,547

[22] Filed: Oct. 14, 1976

[51] Int. Cl.² ............................................. A01K 64/00
[52] U.S. Cl. ......................................... 119/5; 264/285
[58] Field of Search ...................... 119/5; 425/89, 445, 425/446, DIG. 39, DIG. 13; 264/319, 322, DIG. 66, 285; 47/66; 220/82 R, 352; 113/1 N, 1 G, 120 V, 120 K

[56] References Cited

U.S. PATENT DOCUMENTS

| 1,481,435 | 1/1924 | Rossberger | 119/5 |
| 3,096,903 | 7/1963 | Grant | 220/352 |
| 3,696,789 | 10/1972 | Richard | 119/5 |
| 3,903,844 | 9/1975 | Greenia | 119/5 |

FOREIGN PATENT DOCUMENTS 571,805  1/1976  Switzerland ................................. 119/5

Primary Examiner—Russell R. Kinsey
Assistant Examiner—Daniel J. Leach
Attorney, Agent, or Firm—Neuman, Williams, Anderson & Olson

[57] ABSTRACT

A triangular aquarium comprising a three-sided vertical body and a base connected thereto to form a container. The height of the body is several times the width of its widest side. The body is formed from a single sheet of transparent material which has a substantially uniform thickness. The sheet of material is positioned on a heating form and two bandlike areas extending the length of the sheet are heated until the material is malleable. The sheet is folded along each of the heated bands to form a three-sided body, with two of the included angles being less than 90° and having a radius of curvature substantially greater than the thickness of the sheet material. The two lengthwise edges of the folded sheet material abut to form the third angle and are bonded together to complete the body. The base is secured at one end of the body to form a container.

6 Claims, 8 Drawing Figures

AQUARIUM AND METHOD OF MAKING SAME

BACKGROUND OF THE INVENTION

The present invention is directed to a tall triangular aquarium wherein the height is many times the width of the widest side and a method of making the aquarium.

Aquariums are, of course, well-known in the prior art, and while there is no recognized standard shape, one of the most common is the rectangular with approximate dimensions of 22 inches high, 18 inches long and 8 inches wide. However, many other geometric shapes have been disclosed, such as the triangular shape of U.S. Pat. No. 3,696,789, issued to Eugene Richard on Oct. 10, 1972. This triangular aquarium has three separate side panels which are bonded together with glue or a similar material. In this and other standard aquariums, in order to maintain the sides in watertight abutment, a border strip of metal is affixed to the top and/or bottom of the aquarium. As the height of the aquarium increases, the water pressure against the sides and their connecting joints increases and furthermore, as the number of seamed joints increases, the chance of failure of one of the joints increases. The metal or plastic border strips are needed for reinforcing strength and are aesthetically unattractive and detract from the artistic lines of the aquarium.

Early developments of the inventor overcame the disadvantages of the prior aquariums with three separate side panels bonded together by using a single sheet of transparent material folded upon itself to form the body or chamber of the aquarium. The inventor's aquarium with the side walls formed from a single sheet of material requires only bonding along one edge, thereby eliminating the need for the border strip and reducing the possibility of seam failure.

In the inventor's early developments, the folded side walls of the aquarium which form two included angles of less than 90° would frequently rupture at the bending point. This type of fracture in the early aquariums usually occurs after several weeks of use and results from a weakening of the material along the folded angle area during the bending and changes in atmospheric temperature and pressure over a period of time. When the material is folded to form the triangular body, the material thickness along the bending line is substantially reduced. The pressure, above atmospheric pressure, against the side walls of an aquarium approximately 5 feet in height is on the order of magnitude of 300 pounds per square foot. The weakended area of reduced thickness fails under this pressure and the uncontrollable failure renders the early tall triangular aquarium unreliable.

SUMMARY OF THE INVENTION

The present invention is directed to a tall triangular aquarium in which the side walls are formed from a single sheet of transparent material. The height of the side walls of the aquarium is several times the width of its widest side. To form the side walls of the body of the aquarium, a sheet of transparent material with a substantially uniform thickness is placed on a heating frame or mandrel. Two bandlike portions of the sheet material which extend its longitudinal length are heated until this part of the material becomes malleable. The entire sheet of material is removed from the heating mandrel and folded along the heated strips to form a generally triangular body which is open at the top and at the bottom. When the sheet material is folded, the sides make two included angles which are each less than 90° and have a radius of curvature substantially greater than the thickness of the sheet material. Forming the sheet material so that each included angle has a large radius of curvature in comparison to the thickness of the material provides a body with walls of substantially uniform thickness. The uncontrolled fracturing experienced in the inventor's early aquarium models caused by the reduction of thickness of the material at the point of bending is substantially eliminated.

The bandlike areas which are heated must be of a sufficient width to permit the folding of the sheet material so that each included angle has a substantial radius of curvature in comparison to the thickness of the material. The large radius of curvature of the folded angles increases the strength of the chamber without the necessity of unattractive metal framing along the edges. The two longitudinal edges of the sheet material forming the body abut and together form the third included angle. These edges of the sheet material are bonded together to form the only seam in the body or chamber. A base section is then secured in a watertight manner to cover one open end of the body thereby forming a container.

It is an object of the present invention to provide a triangular aquarium which has a height several times the width of its widest side.

A further object of the present invention is to provide a tall aquarium with the body or chamber portion with a substantially uniform thickness formed from a single sheet of transparent material and which has included angles of less than 90° and a radius of curvature substantially greater than the thickness of the material.

It is an additional object of the present invention to provide a method of forming a tall triangular aquarium from a sheet of transparent material of substantially uniform thickness so that two included angles have large radii of curvature including the step of heating a bandlike area of a sheet of transparent material extending the entire length of the material.

Additional objects and advantages of the present invention will be apparent from reading the detailed description of the preferred embodiment and the description of the drawings in which.

DETAILED DESCRIPTION

Figure 1:
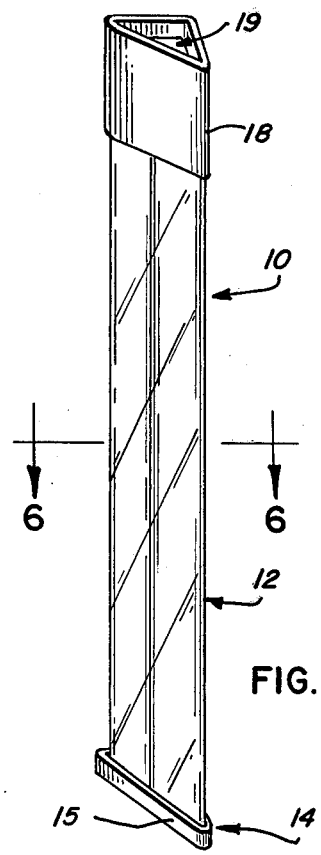
FIG. 1 is a front perspective view showing the triangular aquarium of the present invention.

FIG. 1 is a pictorial illustration of a preferred embodiment of the improved triangular aquarium 10. The body or chamber portion 12 of the aquarium 10 is mounted on a cup-shaped base 14, also see FIG. 2. The base includes a peripheral portion 15 which has a geometric shape similar to that of the lower end of body 12 but several inches wider and longer on each side to provide a trough in which plants or other decorative material may be placed. However, it should be noted that the portion 15 may assume various other configurations from that shown. Juxtapositioned the top of the body 12 and supported thereby is a removable hood 18. The hood is provided with a horizontal partition or plate 19 which is recessed from the top of the hood and is adapted to have attached thereto various devices, not shown, normally associated with aquariums such as a lamp and an air pump. Positioned beneath partition 19 and protruding inwardly from the vertical walls or sides 19a of the hood are lugs, not shown, which engage the upper edge of the body 12 and cause the hood to assume its proper position relative to the body.

FIG. 1 illustrates that the height of the aquarium is several times the width of its widest side. The height of the aquarium is determined primarily by the vertical height of the body 12 in which water, tropical plants and fish will be placed. The base 14 and the hood 18 actually form a portion of the aquarium and add to its overall dimension, however, these components are not considered when reference is made to the height of the aquarium unless specifically included. The overall height of the aquarium including the base and hood is approximately 72 inches with the hood accounting for approximately 8 inches and the base accounting for approximately 1 inch. The widest side or hypotenuse 12a of the triangular body 12 has a width of approximately 15 inches and each of the remaining sides 12b and 12c has a width of approximately 10 inches. A tall triangular aquarium with the above dimensions will contain approximately 12 gallons of water. The pressure at the lower region of the aquarium against the walls due to this height or column of water will be approximately 325 pounds per square foot. The sides are transparent and provide a large viewing area for the aquatic contents notwithstanding that the aquarium occupies a minimum amount of floor space. This outstanding feature of the aquarium makes it well adapted to confined areas with limited space for decorations.

Figure 2:
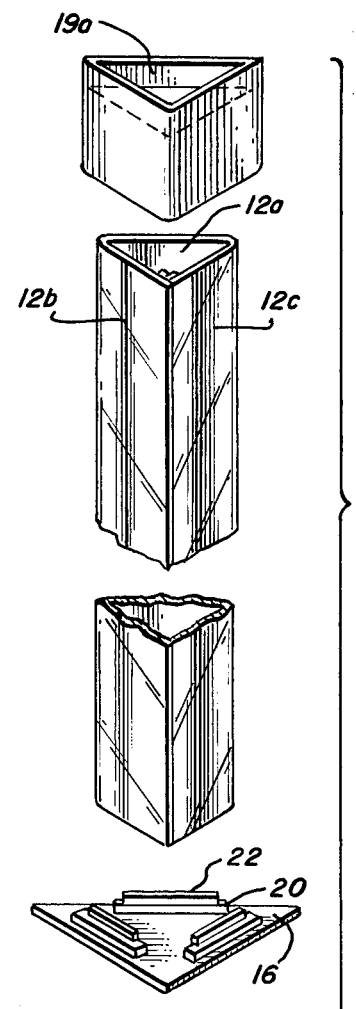
FIG. 2 is a fragmentary, exploded perspective view showing the major component parts of the aquarium of FIG. 1.

FIG. 2 illustrates an exploded view of the component parts of the aquarium 10. The hood 18 is slightly larger in cross sectional area than the upper portion of body 12 and slidably fits over the body upper portion. The hood 18 can be formed from any lightweight material such as plastic. The base 14 further includes a planar plate 16 which is preferably of the same cross sectional shape as the lower portion of body 12 but is larger in area. The body 12 is positioned on a planar base plate 16 so that it is centrally located and equidistant from the perimeter of the base and is secured thereto so as to form a watertight joint therebetween. Suitable cement or adhesive means may be utilized to form the joint. It should be noted that the base plate 16 is preferably made from transparent material similar to the body 12 and could be any shape provided it is large enough to cover the lower open end of the body 12. To improve the bond between the body 12 and base plate 16, two support bars 20 and 22 preferably made from material such as plastic may be utilized at each side of the body 12, see FIG. 3.

Figure 3:
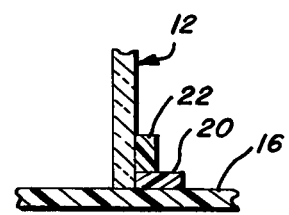
FIG. 3 is a fragmentary, enlarged vertical sectional view of the attachment between the lower end of the triangular body and the subtending base.

Support bar 20 shown in FIG. 3 is fixedly secured to the top surface of base plate 16 and abuts the exterior of the adjacent sides of the body 12 and is secured thereto by cement and other adhesive means. Support bar 22 is fixedly secured by cement or the like to the top surface of bar 20 and against the exterior of the adjacent side of the body 12. The support bars 20 and 22 are substantially rectangular in cross sectional area and are approximately one-half the width of the side to which they are bonded. The support bars 20 and 22 resist the outward force exerted against the sides 12a, 12b and 12c by the column of water within the aquarium.

The base plate 16 is placed within and encompassed by the peripheral portion 15. The portion 15 encompasses the periphery of base plate 16 and is fixedly secured thereto by cement or the like. Thus, the portion 15 and the portion of the base plate 16 protruding outwardly from the exterior of the sides 12a, 12b, and 12c form a trough to accommodate decorative material. The size, shape, and depth of the peripheral portion 15 can be varied to obtain different artistic effects.

Figure 4:
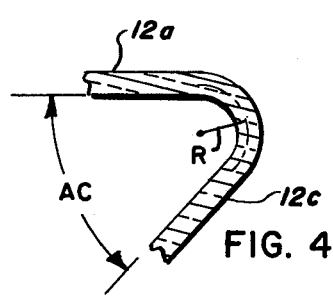
FIG. 4 is an enlarged horizontal sectional view of one corner of the triangular body of the aquarium wherein the curvature of the corner is formed with a large radius which is substantially greater than the thickness of the body-forming material.

FIG. 4 shows the included angle AC formed between two adjacent sides 12a and 12c of the body 12 which are integral to one another. A complementary angle AB is formed between the two adjacent sides 12a and 12b of the body 12 which are also integral to one another. Angle AC is always less than 90° and has a radius of curvature R substantially greater than the thickness of the body sheet material. In the preferred embodiment, the radius of curvature is at least two times the thickness of the sheet material which is approximately one-quarter inch. The mean radius of curvature at the folded corners is large in comparison to the thickness of the material and thus, enables the material to be formed at the angles AC and AB, in the preferred embodiment 45°, without materially reducing the thickness of the material along the line of bending. It is the forming of the large radius of curvature at two of the corners which gives structural integrity and strength to the body which will effectively sustain a pressure of several hundred pounds per square foot.

Figure 5:
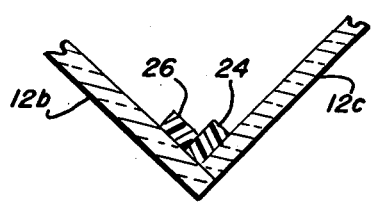
FIG. 5 is an enlarged horizontal sectional view formed between the two longitudinal edges of the body-forming sheet material.

FIG. 5 shows an enlarged view of the corner formed between the elongated edges of sides 12b and 12c. The edge of side 12c abuts the interior surface of side 12b and is bonded thereto by cement or other adhesive means. To reinforce the bond between the sides, elongated bars or strips 24 and 26 are used. Bar 24 is secured to the interior surface of side 12b and to the interior surface of side 12c, see FIG. 5. Bar 26 is then secured to the interior surface of side 12b and to the top surface of the previously mounted bar 24. The reinforcement bars 24 and 26 are substantially rectangular in cross sectional area and are substantially the same length (height) as the body 12. The reinforcement bars are preferably made from transparent material similar to the body 12 and are bonded by cement or other well-known adhesives. Therefore, the only seam necessary to form a complete triangular body is along one corner of the body 12.

Figure 6:
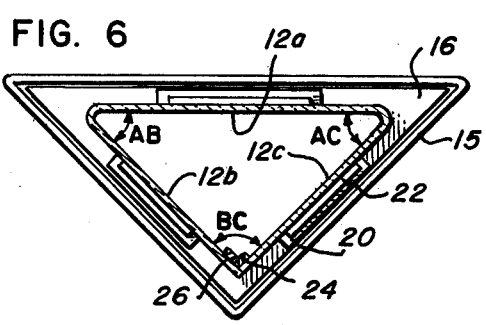
FIG. 6 is a cross sectional view of the aquarium taken along line 6—6 of FIG. 1.

FIG. 6 is a cross sectional view taken along line 6—6 in FIG. 1 which shows the spacial relationship between the various components. In FIG. 6, like elements have been referred to with corresponding numbers as in the other figures. The peripheral portion 15 forms the outside perimeter in FIG. 6. The planar base 16 is juxtapositioned the peripheral portion 15 and is slightly smaller in cross sectional area. The support bars 20 and 22 are shown along sides 12a, 12b and 12c of the body 12. The body 12 has two included angles AB and AC which are both less than 90° and have a large radius of curvature. Reinforcing elements 24 and 26 which extend the length of the body 12 adhere the sides 12c and 12b which together form the angle BC.

Figure 7:
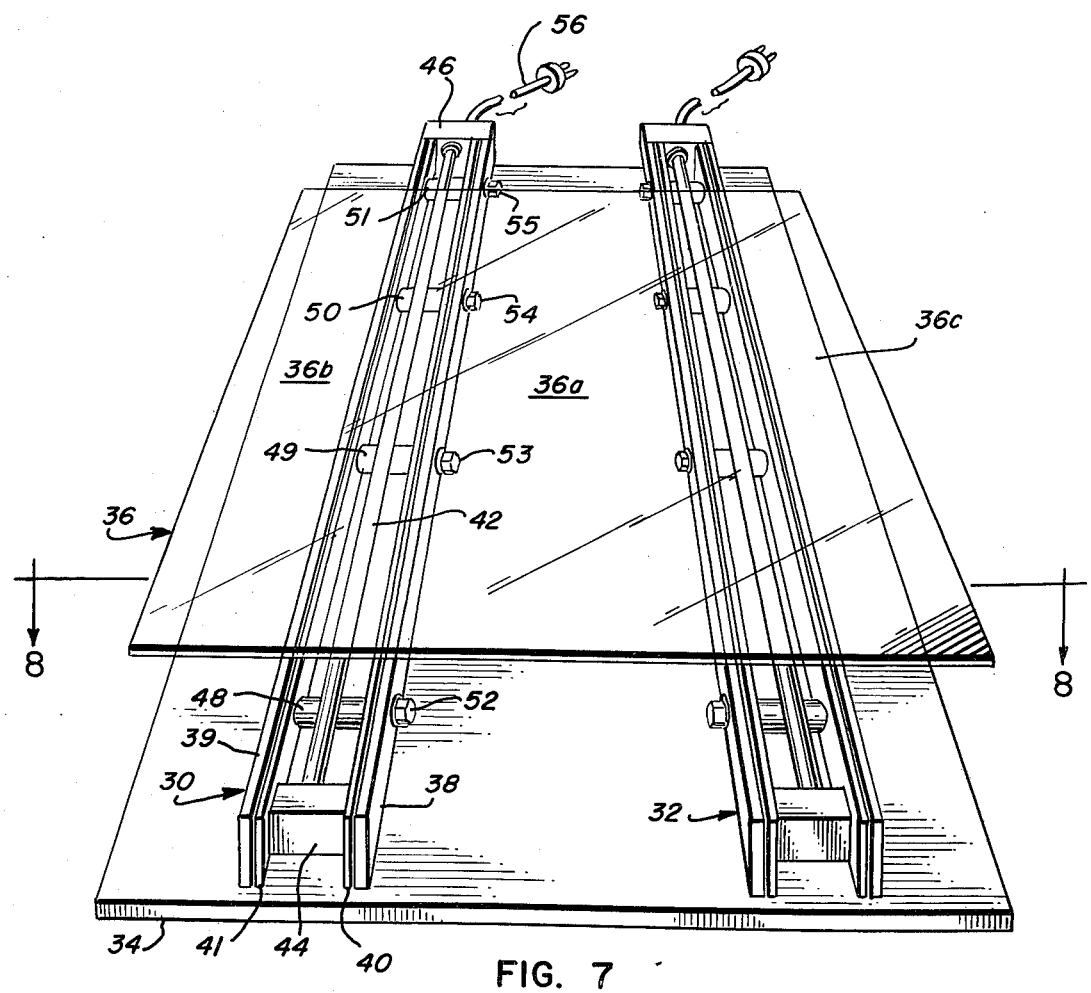
FIG. 7 is a perspective front view of one embodiment of the sheet forming apparatus and showing a sheet of body-forming material positioned therein.
Figure 8:
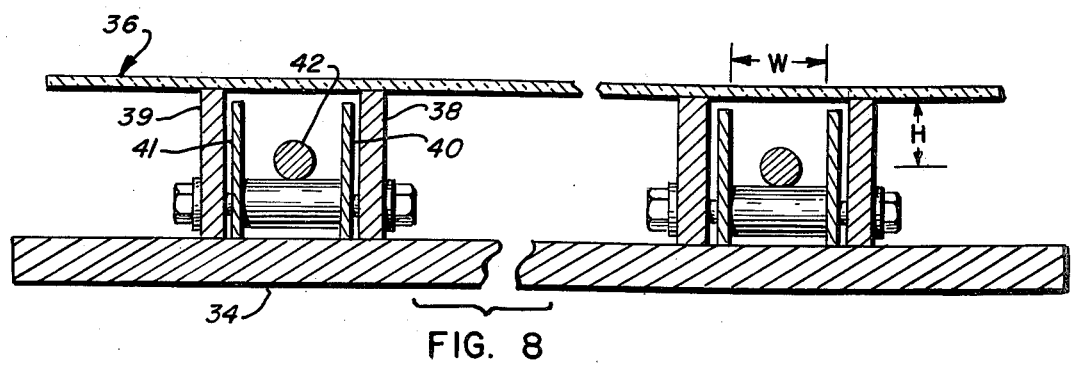
FIG. 8 is a fragmentary, enlarged cross sectional view taken along line 8—8 of FIG. 7.

FIG. 7 illustrates the apparatus or mandrel M used to heat the sheet material 36 before forming same into the contiguous triangular body 12. As illustrated in FIGS. 7 and 8, two elongated similar heating units 30 and 32 are mounted in spaced parallel relation on a supporting frame 34. The heating units 30 and 32 are sufficiently long so that the sheet material 36 placed over both units will be heated along its entire length.

Because the heating units 30 and 32 are of like construction, only unit 30 will be described in detail. Unit 30 has two elongated upright supports 38 and 39 which are coextensive with the heating unit 30. The supports are disposed in spaced parallel relation. Positioned inwardly of the supports 38 and 39 are pads or insulators 40 and 41. The pads 40 and 41 are made from asbestos or the like and are used to confine the generated heat within a specified area. Disposed equidistant from and parallel to the pads 40 and 41 is a heat generating device 42 which may be an electric rod or any other well-known means. The rod 42 spans the entire length of the unit 30. The rod 42 is supported at the front and rear of the unit 30 by insulating brackets 44 and 46.

Periodically spaced along the length of the heating element are tubular spacer elements 48, 49, 50 and 51 which supportingly engage the underside of the rod. In the preferred embodiment, there are four such intermediate supporting elements. However, it is obvious that a greater or lesser number of elements may be used which provide longitudinal support for the heating rod 42 so that the element remains undistorted throughout when it is heated. The undistorted condition of the heating element is necessary so that the sheet material 36, such as acrylic, is uniformly heated along well-defined narrow bands without the occurrence of undesirable hot spots. Once the material in the bands becomes sufficiently malleable, the portions 36b and 36c of the sheet 36 disposed outwardly of the heating units 30 and 32 may be folded relative to the sheet portion 36a intermediate the units so as to form sides 12b, 12c and 12a respectively. The supports 38 and 39, pads 40 and 41 and spacer elements 48, 49, 50 and 51 are retained in assembled relation by fasteners 52, 53, 54 and 55. In the preferred embodiment, the heating rod is electrically energized via a plug assembly 56 adapted to be inserted in a conventional wall outlet or other source of electricity (not illustrated).

As seen in FIG. 8, a slight air space is provided between the support and the adjacent pad which enhances the insulating effect of the pad. The rod 42 will heat a bandlike area extending the entire length of the sheet material 36 and having a width W which is adequate to provide for the folding along the length of the material to an angle less than 90° with a large radius of curvature in comparison to the thickness of the material. In the preferred embodiment, the material is one-quarter inch thick and the area heated by the rod 42 is approximately 2 inches wide. However, it should be apparent that other dimensions regarding the thickness of the material and the width of the bandlike area material heated can be used. The rod 42 is recessed a distance H (e.g., 2 inches) from the underside of the sheet material 36. In the preferred embodiment the rod 42 reaches a temperature of 350° F. which is maintained for a period of 2 minutes. It should be noted that the parameters of temperature, distance H, time and thickness of material are interrelated and the change of one will require corresponding changes in others.

Thus, it will be seen that a decorative, strong and appealing tall aquarium has been described which requires a minimal amount of floor space. The body portion of the aquarium is formed in facile manner from a single blank of transparent plastic material and requires a minimal amount of reinforcement. The hood may be readily removed to facilitate cleaning and replenishing of water and the like.

I claim:

1. An aquarium comprising:
   an upright three sided body formed of a substantially rectangular single sheet of transparent material and having top and bottom open ends;
   each side having a substantially uniform thickness and said sides together forming three included angles;
   at least two of said included angles being less than 90° and having a radius of curvature at substantially greater than the thickness of said sides;
   the height of said body being substantially greater than the width of the widest side;
   seaming means for securing together only the two opposite edges of said single sheet defining said body; and,
   a base member subtending said body and being connected to said bottom open end and forming therewith a watertight seal.

2. An aquarium as set forth in claim 1 further including;
   a hood portion positioned at said top open end of said body and supported thereby.

3. An aquarium comprising:
   an upright three sided body of transparent sheet material having open top and bottom ends;
   each side having a substantially uniform thickness and said sides together forming three included angles;
   at least two of said included angles being less than 90° and having a radius of curvature at substantially greater than the thickness of said sides;
   the height of said body being substantially greater than the width of the widest side;
   seaming means for securing together only the two opposite edges of said sheet defining said body;
   a base member subtending said body and being connected to the bottom end thereof and forming therewith a watertight seal;
   said base further comprising:
   a peripheral portion having the same geometric shape as said body and being longer in length and width and substantially shorter in height; and,
   a planar plate having the same geometric shape as a cross section of said body and being longer in length and width;
   said body being connected to said plate at an area equidistant from the perimeter of said plate; and,
   said peripheral portion being connected to the perimeter of said plate so that a trough is formed between the exterior surface of said body, said plate and said peripheral portion.

4. An aquarium as set forth in claim 3 wherein said seaming means comprises:

a first support bar fixedly secured to the interior surfaces of said opposite side edges of said sheet; and, a second support bar fixedly secured to the interior surface of one of said opposite side edges and said first support bar.

5. An aquarium as set forth in claim 2 wherein said base member comprises:

a peripheral portion delimiting said bottom end and being spaced from the body sides; and, a planar plate connected to said bottom end, the perimeter of said plate projecting laterally outwardly from the sides of said body; and, said peripheral portion and the laterally projecting perimeter of said plate coating with the exterior surface of said body sides to form an encompassing trough.

6. An aquarium as set forth in claim 5 wherein said seaming means comprises:

a first support bar fixedly secured to the interior surfaces of said opposite side edges of said sheet; and, a second support bar fixedly secured to the interior surface of one of said opposite side edges and said first support bar.

* * * * *